United States Patent
Epstein (10) Patent No.: US 8,538,847 B2
(45) Date of Patent: Sep. 17, 2013

(54) METHOD FOR INVESTING WORKING CAPITAL

(76) Inventor: Lee Epstein, Phoenix, AZ (US)

(*) Notice: Subject to any disclaimer, the term of this patent is extended or adjusted under 35 U.S.C. 154(b) by 1671 days.

(21) Appl. No.: 10/945,548

(22) Filed: Sep. 20, 2004

(65) Prior Publication Data

US 2005/0119958 A1    Jun. 2, 2005

Related U.S. Application Data

(63) Continuation of application No. 09/558,352, filed on Apr. 26, 2000, now Pat. No. 6,795,811.

(51) Int. Cl.
G06Q 40/00    (2012.01)

(52) U.S. Cl.
USPC ............................. 705/36 R; 705/35

(58) Field of Classification Search
USPC ....................... 705/36, 35, 36 R, 37
See application file for complete search history.

(56) References Cited

U.S. PATENT DOCUMENTS

| | | | | |
|---|---|---|---|---|
| 4,751,640 | A * | 6/1988 | Lucas et al. | 705/36 R |
| 5,794,207 | A * | 8/1998 | Walker et al. | 705/1 |
| 5,915,209 | A * | 6/1999 | Lawrence | 340/3.7 |
| 5,966,699 | A * | 10/1999 | Zandi | 705/38 |

OTHER PUBLICATIONS

Don't let repos come back to haunt you. Lintecum, Lisa. ABA Banking Journal: Aug. 1991; 83, 8.*
Investments with a twist. Tolen, Steve. Credit Union Management; Jul. 1990; 13, 7.*
Claws meet teeth. The Economist. May 31, 1997. vol. 343, Iss. 8019; p. 69.*

* cited by examiner

Primary Examiner — Alexander Kalinowski
Assistant Examiner — John O Preston
(74) Attorney, Agent, or Firm — Donald J. Lenkszus (57) ABSTRACT

A method of doing business comprises receiving an investment contract offer from a corporate investor specifying a principal amount and a maturation term. The investment contract offer is communicated to a plurality of securities dealers, each of whom may communicate an acceptance of the offer by providing an identification of the securities and a rate. At the end of a predetermined time period, a selection algorithm is used to select the most favorable or aggregation of most favorable acceptances to the corporate investor. In one embodiment of the invention, selection at the close of the predetermined time period is automatic acceptance and is communicated to the corporate investor and to the securities dealer having the selected acceptance.

16 Claims, 5 Drawing Sheets

METHOD FOR INVESTING WORKING CAPITAL

RELATED APPLICATIONS

This application is a continuation of U.S. patent application Ser. No. 09/558,352 filed Apr. 26, 2000 now U.S. Pat. No. 6,795,811.

FIELD OF THE INVENTION

This invention pertains to investing of corporate working capital, and a method of utilizing the Internet for such investing.

BACKGROUND OF THE INVENTION

Traditionally, a public company invests its working capital utilizing a "buy-and-hold" strategy. Investments are always made in short term debt or debt "lookalikes". The investment is always of high credit quality to limit risks due to the possibility of issuer default. The investor purchases the security and holds it until receiving the par value of the investment.

The investor utilizing this strategy does not invest for capital appreciation. Rather, the corporate investor looks to protect the corpus and to collect interest or dividend income only. Par value may be facilitated by maturity, in the case of commercial paper, or by demand features, e.g., puts, auctions, etc., to assure that the investor will receive every cent of principal. Public companies, and private companies that qualify to be public, operate under a board policy outlining minimum credit acceptable standards of issuers, maximum maturity of a single investment, maximum duration and diversity delimiters to limit exposure to a single issuer, country, sector or other limits.

Typically a corporate investor executes this strategy by looking at a cash forecast, that typically includes an accounts payable forecast. From this the investor determines a principal amount available for investment and when the principal amount is needed. The individual responsible for investing places inquiries with several securities dealers to determine what investments that qualify with the corporate investment policy are available and what rates are offered. The corporate investor shops for investments. In theory, the investor then takes the highest offer and invests until maturity, When that investment matures, the process is repeated.

With the increasing use of the Internet as a backbone for electronic commerce, it would be highly desirable to be able to provide the corporate investor with the opportunity to make such investments via the Internet. However, to date no one has been able to efficiently offer an Internet based system to corporate investors. In large part, the reason is that Internet based investing has not been efficient because there are tens of thousands of offers made daily. Most of the offers are newly issued investments rather than investment that are traded in a secondary market. By way of example, if IBM issued commercial paper yesterday at 5.80%, today the may issue it at 5.85% and tomorrow at yet another rate.

SUMMARY OF THE INVENTION

In accordance with the principles of the invention, an Internet web site is hosted at which the traditional investment process is reversed. In the traditional process, corporate investors, having funds to invest, are offered various securities. Securities dealers offer the securities, directly or indirectly. Various securities are available at various rates and terms. The corporate investor, or his or her agents, typically shops around for the best available rate for the funds to be invested. The investor identifies the desired securities and invests in them. In the typical transaction securities dealers offer to sell a security having a specific yield and term. The investor accepts the offer, transfers funds and receives the securities from the securities dealer.

In accordance with the principles of the invention, investors offer contractual agreements to invest specified amounts for specific terms for the best rate of return received within a predetermined time period. The amounts and terms are made available to securities dealers. Securities dealers have the opportunity to propose one or more investment instruments. The proposal is made with the understanding that if the proposed investment instrument is the best offer made within the predetermined time period that the proposal is deemed to be an automatic acceptance to provide the investment instrument.

In the illustrative embodiments of the invention, the investments are in newly issued short-term instruments.

In accordance with one aspect of the invention a method of providing financial services via an Internet web site is provided. A web site on the World Wide Web of computers known as the Internet is hosted to receive log-ons from corporate investors desiring to invest working capital. Each time the corporate investor logs on to the web site to initiate a transaction, the corporate investor is assigned an identification number to maintain anonymity for the transaction. The web site receives transaction request information from the corporate investor. The transaction request information includes an amount to be invested and a desired maturation term. The web site makes the transaction request available to securities dealers for a predetermined period of time. Transaction responses from a plurality of security dealers is received, each transaction response includes an identification of a debt instrument, an interest rate, and a maturation date. At the end of the predetermined period the transaction response having the most favorable terms is selected and communicated to the corporate investor.

In accordance with one aspect of the invention, the corporate investor at the time of making the transaction request is given a choice of selecting whether the transaction response having the most favorable terms is automatically accepted or the choice of making the acceptance conditional upon final approval of the corporate investor. Upon automatic acceptance or receiving acceptance from the corporate investor, the acceptance is provided to securities dealer providing the accepted response. In accordance with one aspect of the invention, acceptance is immediate and automatic upon the close of the predetermined time period in the first instance.

In accordance with another aspect of the invention, a method for using an Internet device to facilitate investments of working capital by corporate investors is provided. An investment request is inputted into said Internet device. The investment request comprises the amount to be invested and a maturity of capital to be invested. The Internet device receives a selected transaction response from one security dealer of a plurality of securities dealers via said central server. The selected transaction response is the most favorable transaction response received from a plurality of securities dealers during a predetermined time period. Transaction acceptance is inputted into the Internet device. Confirmation of transaction acceptance is outputted from said Internet device upon receipt from the central server.

In accordance with yet another aspect of the invention, a method for using an Internet device to facilitate placement short term debt instruments by security dealers is provided. The Internet device is coupled to a central server via an Internet connection. The Internet device receives from a central server an investment request and an identification number. The investment request comprises an amount to be invested and a maturity. The identification number is an identifier unique to a corporate investor. Responses to the investment request from a security dealer is inputted. The response is transmitted to the central server during a predetermined time period. The transaction response comprises an identification of a debt instrument, a rate and a term. The Internet device receives transaction confirmation from said central server if the transaction response is the most favorable transaction response received by said central server.

In the illustrative embodiment of the invention, a corporate investor logs onto the web site of the invention and identifies the amounts and maturity ranges of the investments desired. The corporate investors needs are posted on the web site keeping the identity of the investor secret. Securities dealers log on to the site and offer their best rates to the corporate investor. After a period of time, the posting would end. An on-line confirmation of the trade would be provided. The investor wires funds as is done conventionally and the securities dealer would deliver the investment.

In yet another embodiment of the invention, the system of the invention may aggregate a plurality of investment securities, where, for example, the size of the investment is such that the most advantageous or practical way to invest the amount is in more than one security. In this instance, when the investment offer is posted on a web site, it is noted that aggregation of securities is acceptable. In that instance, securities dealers may respond with the best instruments available. The system of the invention will determine the aggregation that may be formed from the plurality of instruments. At the close of the predetermined time period, each securities dealer proposing an instrument that has been identified as part of the best aggregation will be treated in the same manner as described above as having the best available instrument in the predetermined time period

BRIEF DESCRIPTION OF THE DRAWING

The invention will be better understood from a reading of the following detailed description in conjunction with drawing figures, in which like reference designations are used to identify like elements, and in which.

DETAILED DESCRIPTION

Figure 1:
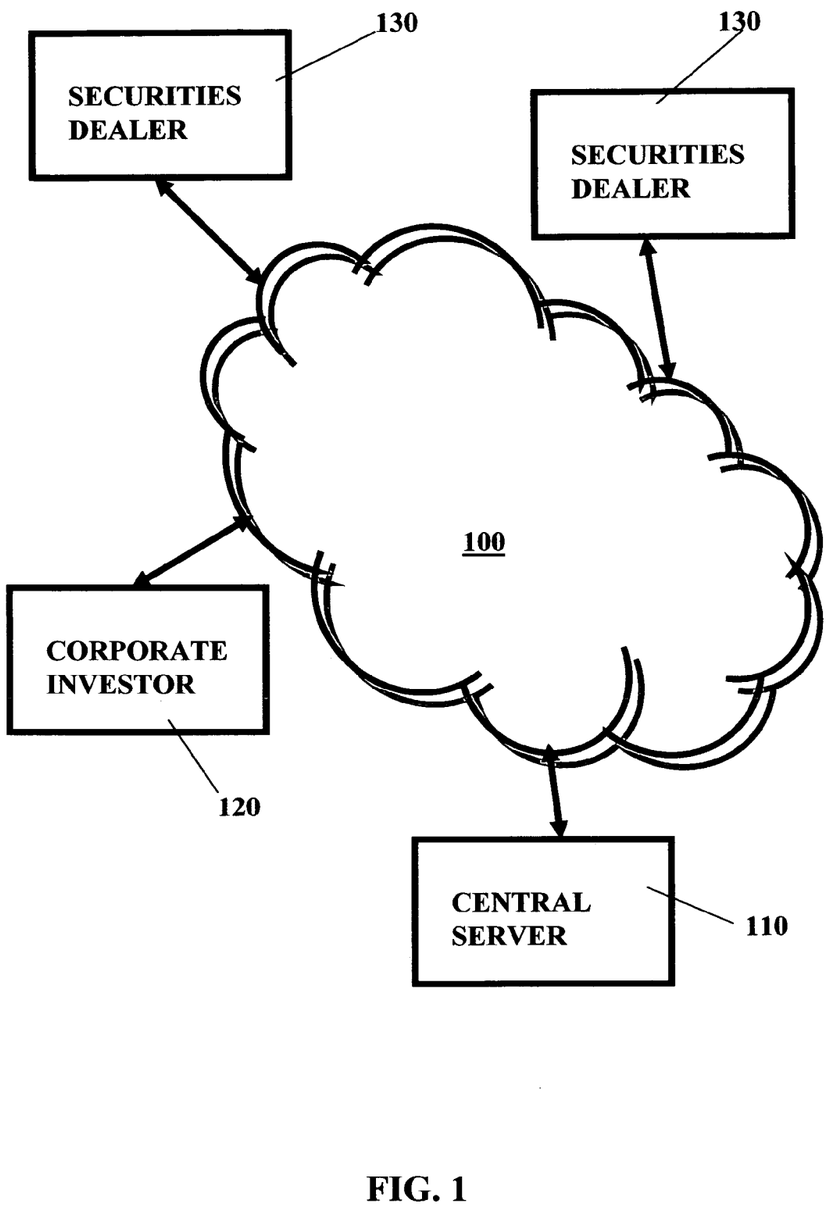
FIG. 1 depicts a system in accordance with the principles of the invention.

Turning now to FIG. 1, the method and apparatus of the invention advantageously utilizes the World Wide Web known as the Internet. In accordance with convention, the Internet 100 is shown as a cloud. It is understood and well known that the Internet includes many interconnected communications links and computers. The particular structure of the Internet forms no part of the present invention. A central server 110 operable in accordance with the principles of the invention is coupled to the Internet 100. An Internet device 120 that is utilized by a corporate investor is coupled to the Internet 100. Although only one Internet device 120 utilized by corporate investors is shown, it will be understood by those skilled in the art that any number of corporate investor Internet devices 120 may be utilized. Also connected to Internet 100 are Internet devices 130 located at securities dealers. Although only two securities dealers Internet devices 130 are shown, it will be appreciated by those skilled in the art that any number of such Internet devices 130 may be coupled to the Internet 100. As used herein, the term "Internet device" is intended to include any and all devices that can establish a coupling to the Internet and can upload and download information via the Internet. Examples of Internet devices include computers, personal digital assistants ("PDA"), Internet telephones, and all manner of devices that communicate via the Internet. The term "Internet device" is intended to be inclusive and not limiting in any sense. Internet devices 120 and 130 may be similar or substantially identical devices. However, the invention is not limited to any particular Internet device nor do any of the Internet devices 120, 130 have to be the same.

Figure 2:
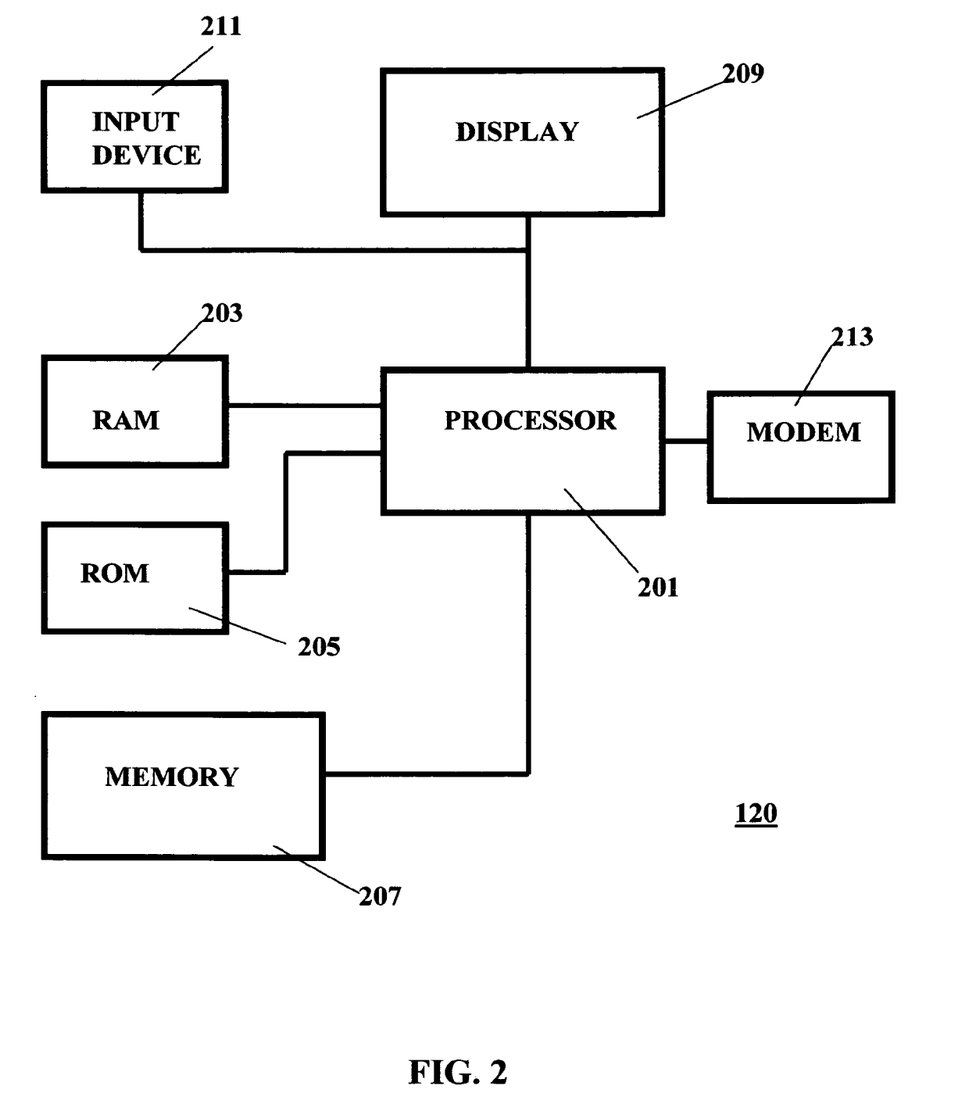
FIG. 2 is a block diagram illustrating an Internet device of a type usable in the system of FIG. 1 in accordance with the principles of the invention.

Turning now to FIG. 2 a representative Internet device 120 utilized by a corporate investor is shown in block diagram form. Internet device 120 includes a processor 201 with associated random access memory or RAM 203, read only memory or ROM 205 and mass memory 207. Memory 207 may be a hard drive or other conventional mass memory that is commercially available. A display 209 and an input device 211 are each coupled to the processor 201. A modem 213 is used to couple the Internet device 120 to the Internet. The particular type of modem is not significant to the present invention and may be of any conventional type commercially available. In other applications, other interfaces to the World Wide Web may be used in place of modem 213. The configuration of Internet device 120 is that of a conventional personal computer or workstation. However, as noted above, any Internet device may be used including Internet telephone devices, Internet tablets and other Internet communications devices. The invention is not limited to any one hardware configuration.

Figure 3:
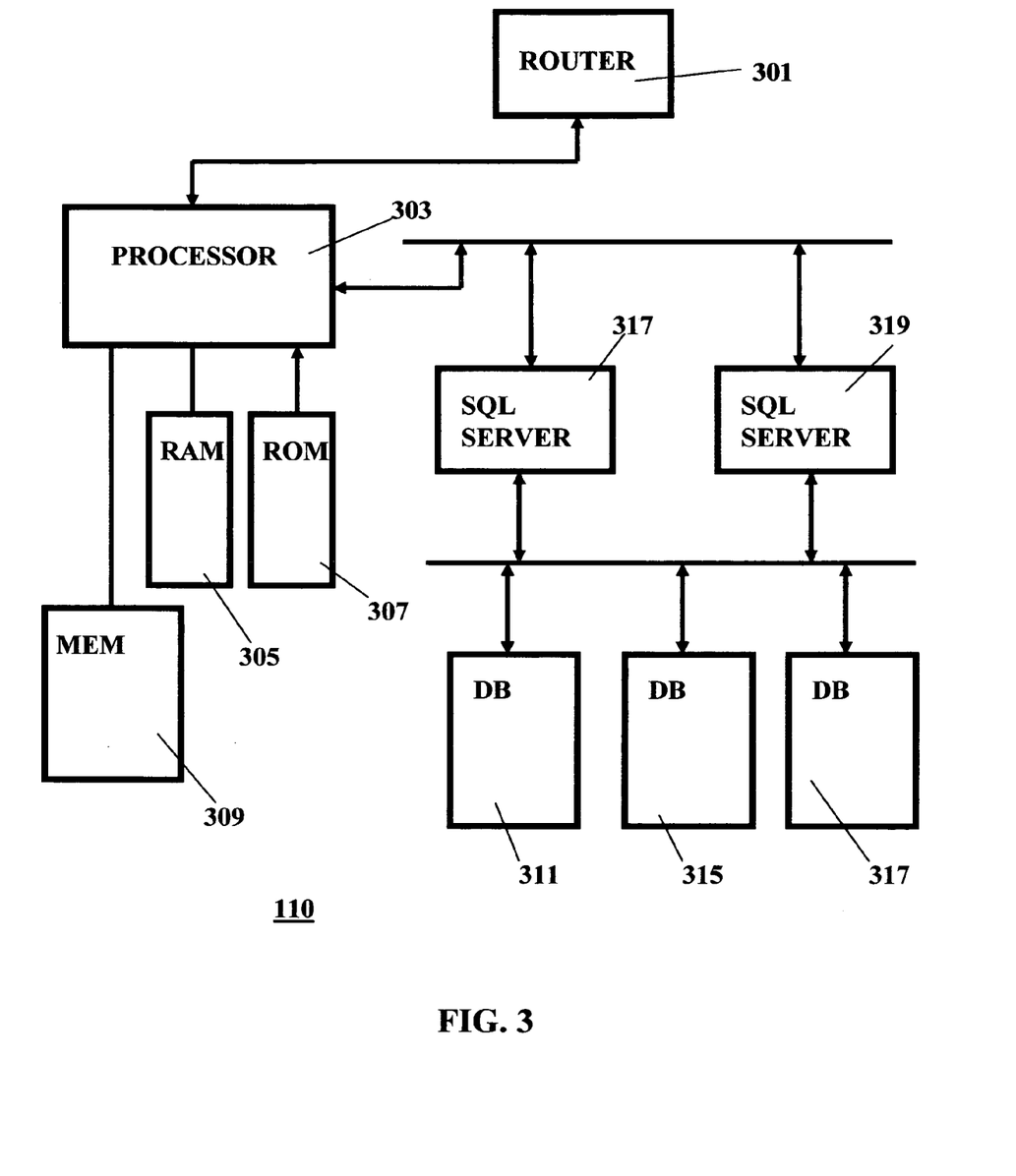
FIG. 3 is a block diagram of a central server useable in accordance with the principles of the invention in the system of FIG. 1.

FIG. 3 illustrates in block form a central server 110 that is particularly useful in the illustrative embodiment of the present invention. Although a particular configuration is shown, it should be apparent to those skilled in the art that various changes and modifications may be made to the system architecture. Central server 110 includes an interface 301 to the Internet. Interface 301 as will be appreciated by those skilled in the art is configured to provide signal levels, types and protocols that are appropriate to the particular type of connection to the Internet that is available to central server 110. Central server 110 includes a processor 303 having associated with it random access memory or RAM 305, read only memory or ROM 307 and bulk memory 309 which may, for example, comprise one or more hard drives or various combinations of different physical memories and memory types. As is conventional with processors, in general, and servers, in particular, the operating system for the server is stored in memory 309. Central server 110 also includes relational data bases 311, 313, 315 and associated SQL servers 317, 319. The general operation of relational data bases 311, 313, 315 and SQL servers 317, 319 is known in the art. Particular details of operation of SQL servers 317, 319 and relational databases 311, 313, 315 are not important to an understanding of the present invention. Central servers are commercially available from several sources and may vary in configuration from that shown in FIG. 3. The particular configuration of the server is not important to an understanding of the invention. Central Server 110 has stored in its memory 309 a software program that causes the central server 110 to operate in accordance with the method described herein below. The relational data bases 311, 313, 315 are used to store information that identifies corporate investors, the amount and timing of desired investments, the time period in which the transaction needs to close. Also associated with each desired transaction, the relational databases 311, 313, 315 store the responses received from securities dealers. The response for each securities dealer includes the rate and term of the security including all relevant identifying information as well as the identity of the securities dealer and all relevant information. Still further, for each transaction, relational data bases 311, 313, 315 store information regarding completion of each transaction including charges made by the system owner to the securities dealer. Audit information is stored in memory 309.

Figure 4:
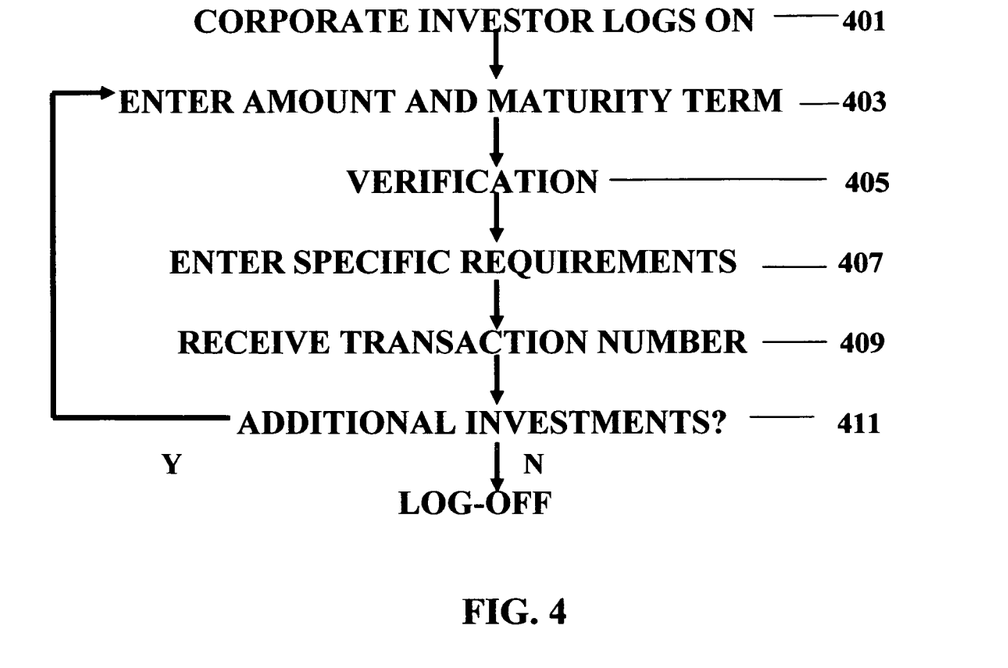
FIG. 4 is a flow diagram illustrating how a corporate investor requests best available investment rates in accordance with the invention.

In operation, a corporate investor utilizing Internet device 120 as shown in FIGS. 1 and 2 logs on to the web site hosted at central server 130 as shown in step 401 of FIG. 4. To utilize the web site, the corporate investor must be registered with the web site. The registration process utilized may be similar to any one of the numerous web site registration processes utilized. For purposes of this description, it is assumed that the corporate investor has previously registered to use the web site. As part of the log-on process, the corporate investor will provide a user id and a password. Other security provisions may be utilized to preserve the integrity of the web site and to assure only legitimate users are logging on. Once the corporate user is logged on and registration has been verified, the corporate investor is invited to enter the principal amount to be invested and the term of the investment. The investor enters the amount and term maturity at step 403. In addition, in one embodiment of the invention, the investor specifies if acceptance of the best investment instrument is to be automatic at the end of a predetermined time period or if the investor desires final approval. Still further, the investor may designate if an aggregation of instruments may be utilized for the investment and again whether acceptance is automatic and/or if approval of the transaction is required. Additional criteria used to qualify investments for this corporate investor have been stored in relational databases 311, 313, 315 and associated with the investor. To verify that the criteria are still current, a verification screen is provided setting out the criteria at step 405. In the event that for this particular investment, the corporate investor desires to modify any criteria, the criteria may be changed or new terms entered at step 407. Central Server 130 provides a transaction number to the corporate investor along with a verification of the desired investment at step 409. The corporate investor is given the option at step 411 to enter other desired investments. If the corporate investor is done with entering desired investments, the investor logs off the web site.

Figure 5:
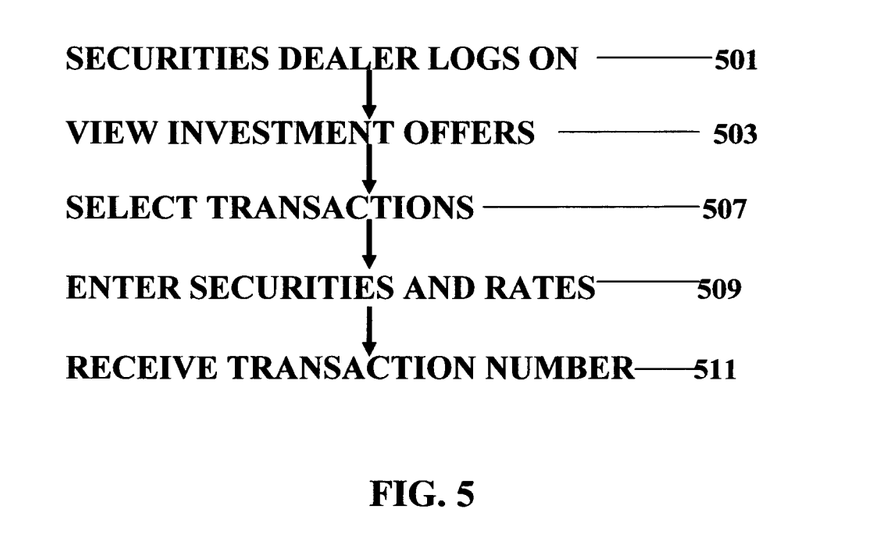
FIG. 5 is a flow diagram illustrating how a securities dealer finds a market for securities utilizing the system and method of the invention.

Turning now to FIG. 5, the operation of the website from the perspective of a securities dealer is shown in flow diagram form. At step 501, the securities dealer utilizing an Internet device 130 logs on to the web site hosted by central server 110. The securities dealer must have previously registered with the web site or will be required to do so before being allowed to proceed. The registration process is similar to well known security registration procedures utilized in other Internet web sites of a comparable nature. The specific registration process utilized is not of particular importance to the novel aspects of the present invention. After the securities dealer logs on, he may view current corporate investors desired short-term investment desires. In one embodiment of the invention, the desired principal amounts and maturities may be viewed as indicated at step 503. In this embodiment of the invention, the transaction contact offers are presented in a table. Each transaction contract offer listed includes a transaction code that is unique to that particular desired transaction. In addition, where an investor has indicated that an aggregation of investment instruments is acceptable, the listing will provide an indication that aggregation is acceptable. The identity of the corporate investors is maintained anonymous at this time and at this stage of the transaction. The securities dealer will select those transactions he or she is interested in at step 507. The web site will provide to the securities dealer the history of the transaction, i.e., the time at which the transaction will close, the securities offered and the rates. This way the securities dealer is able to determine what rate may be can be offered. In the event that the securities dealer decides to offer one or more securities, he will enter his identifier code, and identify the securities and the rates that are offered at step 509. This may be accomplished by utilizing a standardized form to respond. When the securities dealer is satisfied with the entry, he clicks on an icon to present his offer. The central server responds with a transaction number to the securities dealer at step 511.

At the close of the time period for receiving offers, the central server utilizing a selection algorithm identifies the most favorable offer. The most favorable offer will in general be the offer with the highest rate of return for a particular category of instruments. If the investor has indicated that an aggregation of securities is acceptable, the central server will identify the best yielding aggregation. The best yielding aggregation will, in general, be the one that offers the highest combined rate of return. In one embodiment of the invention, central server 110 then generates an email message to the corporate investor giving the corporate investor a limited time period to accept the instruments. The email message will identify the instruments, the maturity dates, the rates of return and the securities dealer or in the case of an aggregation, the securities dealers. Assuming that the corporate investor determines that the investment meets requirements, the corporate investor responds with an approval. The central server logs approval for the transaction. The central server emails the acceptance to the securities dealer or dealers and a confirmation to the investor. The remainder of the transaction is completed in a traditional fashion, with the corporate investor wiring funds to the securities dealer. The securities dealer, in turn, delivers the instrument.

In another embodiment of the invention, the securities dealer and the corporate investor agree in advance at registration on the web site that on close of the time for transactions, the highest offer from a securities dealer is automatically accepted by the corporate investor. In the event of multiple offers at the same interest rate and of comparable quality, the system of the present invention will select one or more of the offers in accordance with a predetermined selection algorithm. The predetermined selection algorithm may be a random weighted selection algorithm. In certain embodiments of the invention, the selection algorithm may be a time-based selection based upon the earliest offer in time. This embodiment has the advantage that transactions are closed automatically. Confirmation of the transaction closure is sent automatically by email to the securities dealer and the corporate investor.

Figure 6:
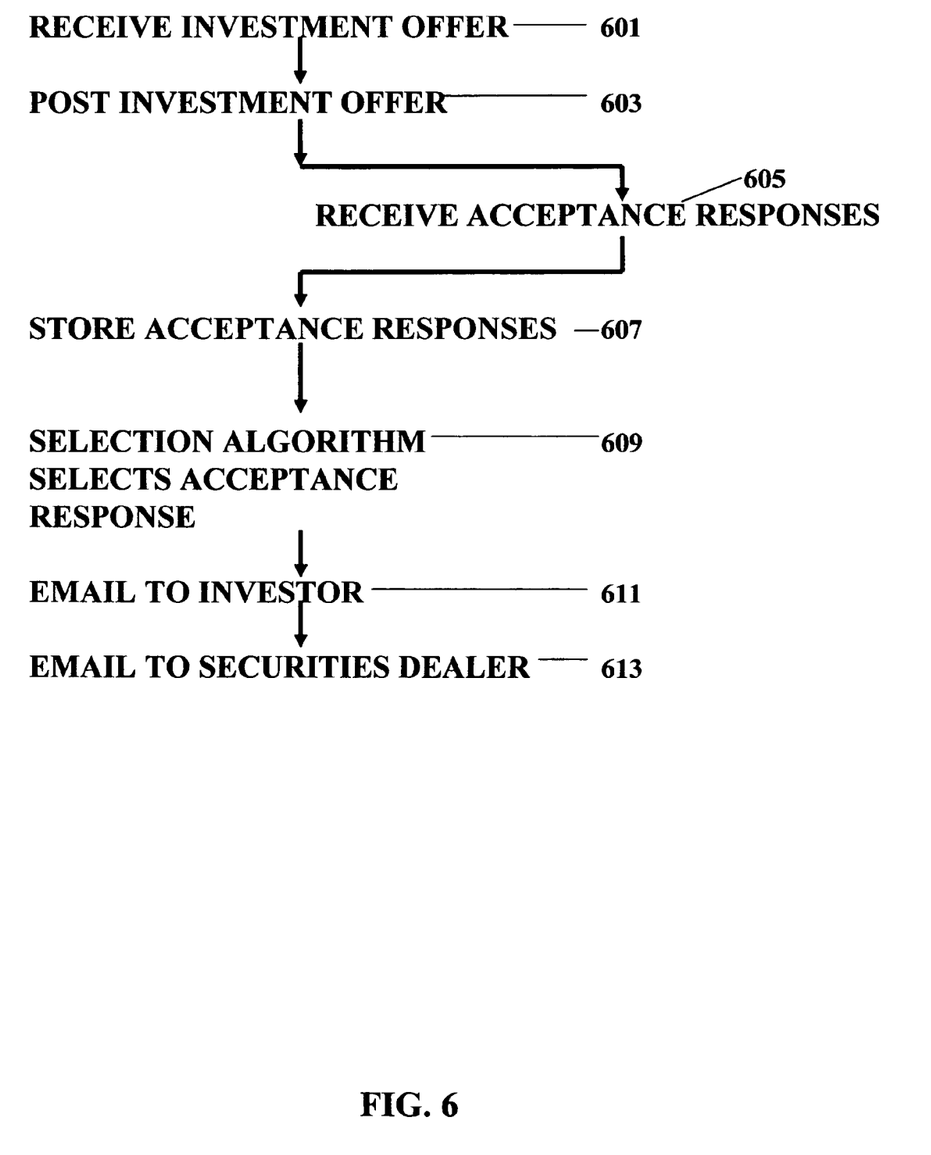
FIG. 6 is flow diagram illustrating operation of the central server shown in FIG. 3.

Turning now to FIG. 6, operation of the server 110 is shown in flow diagram form. Central server 110 receives registered investor investment offer information at step 601. Server 110 may post the investment offer information on its restricted access web site at step 603. Central server 220 receives securities dealers' acceptance responses at step 605. Each acceptance response is conditional upon the acceptance response being selected by the selection algorithm. The securities dealers' responses are entered by the dealers onto a form that complies with the Committee on Uniform Securities Identification procedures (CUSIP). Server 110 extracts information from the form and stores all responses in databases 311, 313 or 315 at step 607. A timer function is provided for each investor request. At closure of the transaction time period the server identifies the highest responses and selects one or more based upon a selection algorithm at step 609. Thus, the application of the selection algorithm removes the only condition associated with the acceptance and the acceptance is complete. A confirming email is sent to the corporate investor at step 611 identifying the securities dealer, the securities, the amounts and terms. Similarly, server ends a confirmatory email to the securities dealer or dealers who had offered the most favorable rates at step 613. The securities dealer is invoiced for use of the system services at the same time as the comfirmatory email is sent.

In accordance with one aspect of the present invention, the server 110 permits two classes of individuals to log-on and to use different but related services. The two classes are corporate investors desiring to invest fixed amounts for specific fixed terms and securities dealers who desire to offer securities to meet the demands of the first class. Each class includes only registered users in the appropriate class. Each class of users is restricted in it related activities on the web site.

The invention has been described in conjunction with specific embodiments. It will be appreciated by those skilled in the art that various changes and modifications may be made to the various embodiments without departing from the spirit or scope of the invention. It is intended that those various changes and modifications be included within the scope of the invention. It is further intended that the invention not be limited to the various embodiments shown and described herein nor limited to those embodiments that would be apparent as of the filing date of this application. It is intended that the invention be limited in scope only by the claims appended hereto.

It is further intended that the uses of means plus function language in the claims not limit the invention to particular structures shown and described in this disclosure or to equivalent structures. It is intended that structural equivalents or process steps, equivalent structures and process steps as well as the particular structures and process steps shown and described are included in the scope of the claimed invention.

What is claimed is:

1. A method for using a device to facilitate short term investments of working capital by a corporate investor, comprising:
   determining a principal amount of working capital for investment;
   determining a specific maturity term for said principal amount;
   utilizing said principal amount and said specific maturity term to form an investment contract offer;
   providing said investment contract offer in a device;
   coupling said device to a central server;
   uploading said investment contract offer to said server from said device;
   selecting one of a first acceptance option or a second acceptance option, said first acceptance option is automatically accepting a transaction acceptance response having most favorable terms to said investment contract offer, and said second acceptance option is conditionally accepting a transaction acceptance response upon approval by the corporate investor seeking said investment contract;
   making said investment contract offer available to a plurality of securities dealers;
   receiving at said server one or more transaction acceptance responses from one or more securities dealers;
   operating said server to utilize said selected one of said first acceptance option or said second acceptance option;
   transmitting to said device at least one transaction acceptance response to said investment contract offer from said central server, said at least one transaction response comprising a rate of return on said principal amount, said central server providing said at least one transaction acceptance response in response to receiving said at least one transaction acceptance response from at least one of a plurality of securities dealers;
   transmitting to said device a notification of acceptance of said at least one transaction response if said first acceptance option is selected;
   transmitting to said device a transaction acceptance response that is conditionally accepted if said second acceptance option is selected; and
   utilizing said central server to select said at least one transaction acceptance response, said central server automatically selecting one of said transaction acceptance response if said first option is selected, and said central server responding to receipt of a transaction acceptance response is received from said device if said second option is selected.

2. A method in accordance with claim 1, wherein:
   accepting said at least one transaction acceptance response via said device if said second acceptance option is accepted.

3. A method of operating an Internet device in accordance with claim 1, comprising:
   generating said investment contract offer for short-term debt instruments.

4. A method in accordance with claim 1, comprising:
   registering said corporate investor using said device with said server prior to said corporate investor inputting said investment contract offer.

5. A method in accordance with claim 1, comprising:
   receiving said transaction acceptance responses only from securities dealers who have previously registered with said server.

6. A method in accordance with claim 1, comprising:
   creating an audit record; and
   storing said audit record.

7. A method for facilitating placement of short term debt instruments by a securities dealer, comprising:
   coupling a device accessible by said securities dealer to a central server;
   receiving from said central server an investment contract offer from a corporate investor of working capital, said investment contract offer being formed in accordance with the steps of determining a principal amount to be invested, determining an investment term, and identifying a predetermined time period during which transaction acceptance responses will be received for said investment contract offer;

identifying an investment instrument and a corresponding interest rate;

utilizing said identified investment instrument and corresponding interest rate to form a transaction acceptance response;

uploading from said device said transaction acceptance response to said central server during said predetermined period of time; and receiving transaction acceptance confirmation from said central server, said transaction acceptance confirmation being automatically generated by said central server if said corporate investor selected an automatic acceptance option or said transaction acceptance confirmation being provided by said central server in response to receipt of an acceptance input from said corporate investor if said corporate investor selected a non-automatic acceptance option and said corporate investor accepted said transaction acceptance.

8. A method in accordance with claim 7, comprising:
creating an audit record; and
storing said audit record.

9. A method in accordance with claim 7, comprising:
registering said securities dealer with said central server prior to inputting said transaction acceptance response.

10. A method in accordance with claim 7, comprising:
receiving from said central server an invoice at or after receiving said transaction confirmation.

11. A method to facilitate transactions between a corporate investor desiring to invest working capital and securities dealers desiring to market short term instruments, said method comprising:

determining a principal amount of working capital for investment;

determining a specific maturity term for said principal amount;

forming an investment contract offer from said principal amount and said specific maturity term;

uploading said investment contract offer to a central server;

selecting one of a first acceptance option or a second acceptance option, said first acceptance option is said server automatically accepting a transaction acceptance response having most favorable terms to said investment contract offer, and said second acceptance option is said server conditionally accepting a transaction acceptance response upon until approval by the corporate investor seeking said investment contract;

utilizing said central server to perform the following steps:
receiving said investment contract offer;
informing a plurality of securities dealers of said investment contract offer;
identifying a predetermined time period;
receiving from one or more securities dealers of said plurality of securities dealers one or more transaction acceptance responses via said central server during said predetermined time period, each said transaction acceptance response being formed by the steps of identifying an investment instrument and identifying a rate of return corresponding to said investment instrument;
communicating one or more of said transaction acceptance responses to said corporate investor;
selecting one of said transaction acceptance responses, said selected one of said transaction acceptance responses being automatically selected by said server if said first acceptance option is selected and said selected one of said transaction acceptance responses being selected only after acceptance by said corporate investor if said second acceptance option is selected; and
communicating said selected one of said transaction acceptance response to the securities dealer originating said selected acceptance response.

12. A method in accordance with claim 11, comprising:
billing said originating securities dealer a predetermined amount for facilitating said transaction.

13. A method in accordance with claim 11, comprising:
registering each of said securities dealers.

14. A method in accordance with claim 11, comprising:
creating an audit record.

15. A method of providing financial services, comprising:
entering an amount of working capital into a device;
entering a desired maturation term into said device;
utilizing said device to automatically generate transaction contract information from said amount of working capital and said desired maturation term;
uploading said transaction contract information to one or more computers;
utilizing said device to upload to said one or more computers a predetermined period of time to accept transaction acceptance responses;
utilizing said one or more computers to make said transaction contract information available to securities dealers via second devices for said predetermined period of time;
utilizing said one or more computers to select one of a first acceptance option or a second acceptance option, said first acceptance option is said server automatically accepting a transaction acceptance response having most favorable terms to said investment contract offer, and said second acceptance option is said server conditionally accepting a transaction acceptance response upon until approval by the corporate investor seeking said investment contract;
receiving transaction acceptance responses inputted to said one or more computers from one or more of said security dealers second devices in response to said transaction contract information, each said transaction acceptance response identifying a debt instrument, identifying a corresponding interest rate, and identifying a corresponding maturation date;
communicating one of said transaction acceptance responses to said device;
operating said one or more computers to automatically select said one of said transaction acceptance responses for acceptance if said first option is selected;
operating said one or more computers to present said one of said transaction acceptance responses to said corporate investor for acceptance if said second option is selected; and
transmitting said selection of said one transaction acceptance response to the one securities dealer second device originating said selected transaction acceptance response.

16. A method in accordance with claim 15, wherein:
initiating selection of said one transaction acceptance response by said corporate investor if said second option is selected.

* * * * *